United States Patent [19]

Valenzuela

[11] Patent Number: 5,399,825
[45] Date of Patent: Mar. 21, 1995

[54] INDUCTOR-CHARGED ELECTRIC DISCHARGE MACHINING POWER SUPPLY

[75] Inventor: Javier A. Valenzuela, Hanover, N.H.

[73] Assignee: Creare, Inc., Hanover, N.H.

[21] Appl. No.: 663,014

[22] Filed: Mar. 1, 1991

[51] Int. Cl.$^6$ ............................................. B23H 1/02
[52] U.S. Cl. ................................................. 219/69.13
[58] Field of Search ....................... 219/69.13, 69.18; 323/222, 224, 235, 282, 287; 324/126

[56] References Cited

U.S. PATENT DOCUMENTS

| | | | |
|---|---|---|---|
| 2,951,142 | 8/1960 | Ullmann | 219/69.13 |
| 3,257,583 | 6/1966 | Pfau | 219/69.13 |
| 3,409,753 | 11/1968 | Inoue et al. | 219/69.13 |
| 3,548,257 | 12/1970 | Drushel et al. | |
| 3,624,338 | 11/1971 | Ellis | 324/69.13 |
| 3,710,252 | 1/1973 | Till | 324/126 |
| 4,242,555 | 12/1980 | Delpretti | 219/69.13 |
| 4,347,424 | 8/1982 | Obara | 219/69.13 |
| 4,507,533 | 3/1985 | Inoue | 219/69.18 |
| 4,617,443 | 10/1985 | Martin | 219/69.13 |
| 4,681,997 | 7/1987 | Inoue et al. | 219/69.13 |
| 4,703,144 | 10/1987 | Goto et al. | |
| 4,720,668 | 1/1988 | Lee et al. | 323/235 |
| 4,725,768 | 2/1988 | Watanabe | 323/222 |
| 4,833,289 | 5/1989 | Obara | 219/69.18 |
| 4,864,092 | 9/1989 | Obara | 219/69.18 |
| 4,967,054 | 10/1990 | Obara et al. | 219/69.13 |
| 4,974,141 | 11/1990 | Severinsky et al. | 323/224 |
| 5,066,900 | 11/1991 | Bassett | 323/224 |
| 5,134,355 | 7/1992 | Hastings | 323/222 |

FOREIGN PATENT DOCUMENTS

| | | |
|---|---|---|
| 1217521 | 5/1960 | France . |
| 56-82127 | 7/1981 | Japan .................. 219/69.13 |
| 56-134131 | 10/1981 | Japan .................. 219/69.18 |
| 287911 | 12/1987 | Japan . |
| 843348 | 8/1960 | United Kingdom . |
| 843546 | 8/1960 | United Kingdom . |

*Primary Examiner*—Geoffrey S. Evans
*Attorney, Agent, or Firm*—James Creighton Wray

[57] ABSTRACT

An electric discharge machining power supply has a capacitor which is recharged using an inductor. After a spark, a transistor switch is closed, and energy from a source is stored in the inductor. The inductor charge period allows for deionization of the spark gap. After the desired amount of energy has been stored in the inductor, the transistor switch is opened, and the energy in the inductor is transferred to a capacitor. When the capacitor is charged, the gap voltage increases to its breakdown value for spark ignition. Because the energy transfer from the inductor to the capacitor is faster than the spark ignition delay, the capacitor is fully charged before the next spark occurs. After the spark ignition delay, a new spark is generated and the cycle is repeated. Other controls and elements are added. Gap voltage is sensed at a point intermediate two resistors between the source and the discharge electrode. A short across the gap is sensed. An inductor/transformer isolates the power source and spark.

8 Claims, 2 Drawing Sheets

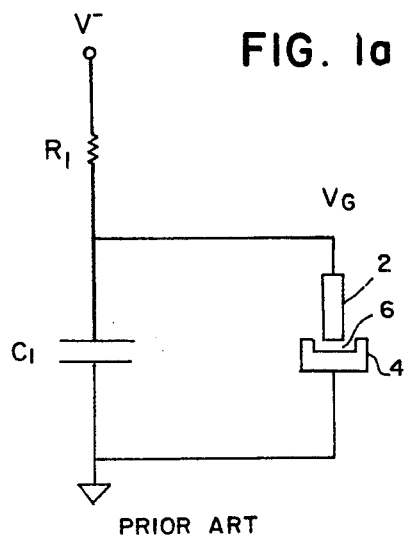
FIG. 1a  
PRIOR ART
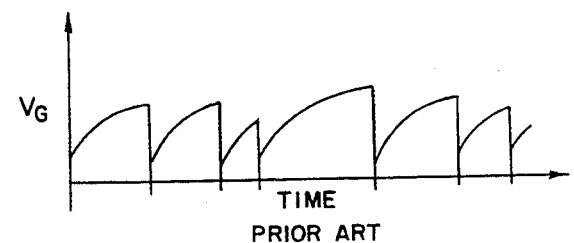
FIG. 1b  
PRIOR ART
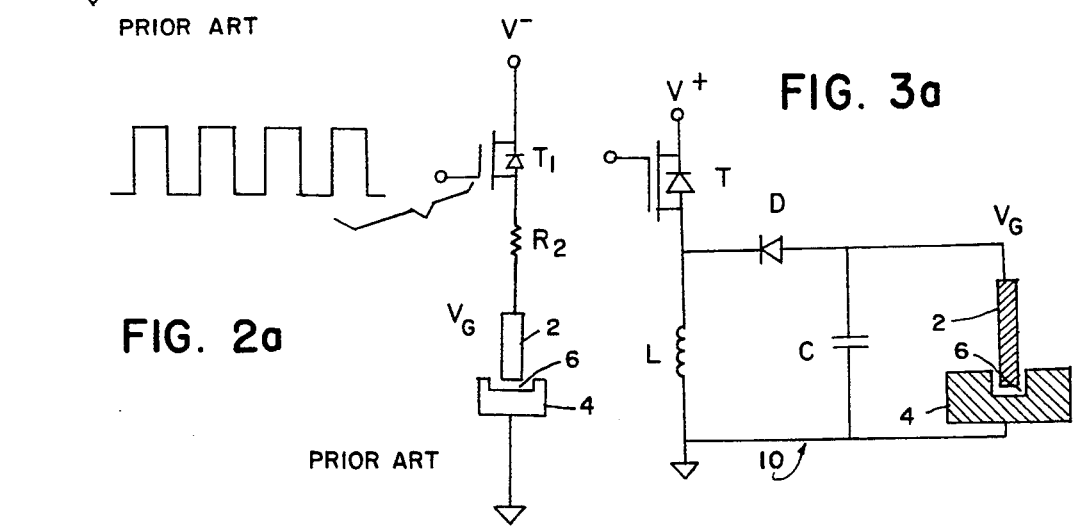
FIG. 2a  
PRIOR ART
FIG. 3a
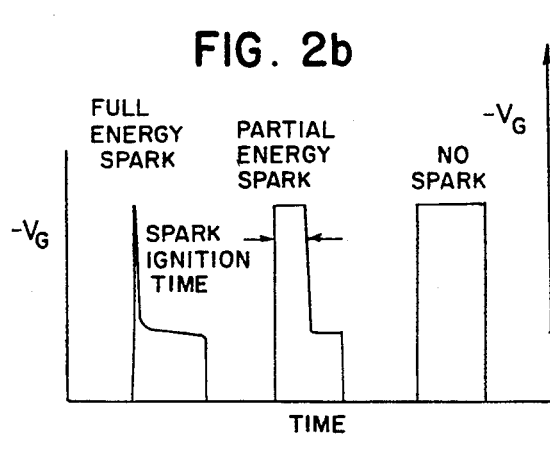
FIG. 2b  
PRIOR ART
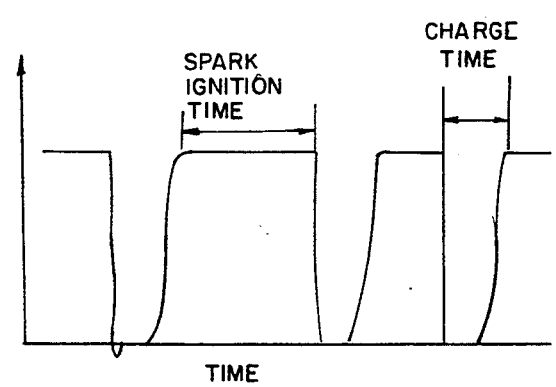
FIG. 3b

INDUCTOR-CHARGED ELECTRIC DISCHARGE MACHINING POWER SUPPLY

BACKGROUND OF THE INVENTION

This invention was made with Government support under Contract Numbers NAS9-17810 and NAS5-30172 awarded by the National Aeronautics and Space Administration. The Government has certain rights in the invention.

Early drive circuits for electric discharge machining (EDM) consisted of a resistor and capacitor in series with a high voltage DC power source. Following a spark, the voltage across the capacitor was zero. The capacitor charged through the resistor until the gap breakdown voltage was reached, and the electrode sparked again.

Although simple, the resistor charged power supply had several drawbacks.

One was slow sparking frequency. The maximum sparking rate was limited by the time constant of the RC circuit. The value of the resistor had to be large to allow quenching of the spark following the discharge of the capacitor. Hence, the capacitor charge times were long, leading to slow metal removal rates.

Another was non-uniform spark energy. Because of the long time required to charge the capacitor, random fluctuations in the gap conditions caused the next spark to occur, usually before the capacitor was fully recharged. Hence, the energy of the sparks varied. While the material removal rate depended on the average spark energy, the surface finish was determined by the highest energy sparks from a fully charged capacitor. Therefore, if a large capacitor were used to increase the average spark energy, the surface finish would have deteriorated.

Low efficiency was a problem. The energy dissipated in the charge resistor was equal to the energy stored in the capacitor. Hence the average spark power was at best equal to half the input power.

Present day switched EDM power supplies use transistor switches to generate a train of voltage pulses. These power supplies allow independent control of frequency and duty cycle of the voltage pulse train. A resistor in series with the spark provides current control.

Although the voltage pulses in a switched EDM power supply have equal duration, the spark energies are not necessarily uniform because of variable spark ignition delays. That effect becomes important when machining small parts and during finishing operations. In those cases it is desirable to reduce the pulse width to reduce spark energy, but, as the pulse width is reduced, a larger fraction of the pulses is inactive, and hence the metal removal rate is greatly reduced. Moreover, in switched EDM power supplies, a large fraction of the energy is dissipated in the current limiting resistor.

SUMMARY OF THE INVENTION

The invention provides a new electric discharge machining power supply that overcomes problems of the prior art.

A capacitor is recharged using an inductor. After each spark a transistor switch is closed, and energy is stored in an inductor. The inductor energization period allows for deionization of the gap. After the desired amount of energy has been stored in the inductor, the transistor switch is opened, and the energy in the inductor is transferred rapidly to the capacitor. As the capacitor is charged, the gap voltage increases to its operating value. Even if a spark was triggered while the energy was being transferred from the inductor to the capacitor, the total spark energy would be equal to the energy stored in the inductor. After the spark ignition delay, a new spark is generated and the cycle is repeated.

Other controls and elements are added to the basic concept. Gap voltage is sensed at a point intermediate two resistors between the source and the discharge electrode. When gap voltage falls below a preselected level, the charging cycle is initiated. A combined inductor/transformer is used to isolate the workpiece and electrode from the power source potential and allow reversal of gap polarity.

The inductor-charged EDM power supply of the present invention has several advantages over existing EDM power supplies. Among the principal advantages are:

Uniform Spark Energy—The energy delivered in each spark depends only on the duration of the inductor charge cycle. Unlike previous approaches, in this circuit the spark energy is independent of the spark induction time. A uniform spark energy allows better control of the surface finish.

High Metal Removal Rates—the total charge period can be made quite short, between one and five microseconds, and hence the sparking frequency is limited primarily by the spark ignition delay. Within a few microseconds of a spark, the gap voltage is restored to its full value and a new sparking cycle initiated. The sparking rate, therefore, approaches the physical upper bound set by the spark ignition delay.

High Efficiency—circuit losses are very small since no resistances are used to charge the capacitor or limit the spark current. Control currents are very small (mA range) and, hence, most of the input power goes to the spark.

These and further and other objects and features of the invention are apparent in the disclosure, which includes the above and ongoing written specification, with the claims and the drawings.

BRIEF DESCRIPTION OF THE DRAWINGS

FIG. 1a shows a prior art resistor-charged EDM power supply, having a resistor and capacitor in series with a high voltage DC power source.

FIG. 1b shows a typical electrode voltage trace for the power supply shown in FIG. 1a.

FIG. 2a shows a switched EDM power supply using a transistor switch to generate a train of voltage pulses.

FIG. 2b is a graph schematically illustrating that spark energies from the prior art switched EDM power supply of FIG. 2a are not uniform because of the variable spark ignition delay.

FIG. 3a is a simplified schematic representation of an inductor-charged EDM power supply of the present invention.

FIG. 3b is a schematically illustrating the time relation between charge and spark ignition delay.

DETAILED DESCRIPTION OF THE DRAWINGS

Early drive circuits for electric discharge machining consisted of a resistor $R_1$ and capacitor $C_1$ in series with a high voltage DC power source $V^-$, as illustrated in FIG. 1a. The voltage on the capacitor builds sufficiently to create a spark between the electrode 2 and workpiece 4. A typical electrode voltage trace for this circuit is shown in FIG. 1b. Following a spark, the voltage $V_G$ across the capacitor $C_1$ is zero and the capacitor $C_1$ charges through the resistor $R_1$ until the gap 6 breakdown voltage is reached and the electrode sparks again.

Another prior art EDM power supply shown in FIG. 2a uses a transistor switch $T_1$ to generate a train of voltage pulses $V_G$, as illustrated in FIG. 2b. This power supply allows independent control of the frequency and duty cycle of the voltage pulse train. A resistor $R_2$ in series with the spark gap 6 provides current control.

A simplified schematic of an EDM power supply 10 of the invention is shown in FIG. 3a. As in the RC EDM power supply shown in FIG. 1, the spark in power supply 10 is produced by the discharge of capacitor $C_2$.

However, in the power supply 10 the capacitor $C_2$ is recharged using an inductor $L_1$ instead of a resistor. Following a spark, the transistor switch T is closed, and energy is stored in the inductor $L_1$. The inductor energization period is of the order of 1 to 5 microseconds, which provides sufficient time for deionization of the gap 6 between the electrode 2 and the workpiece 4. After the desired amount of energy has been stored in the inductor $L_1$, the transistor switch $T_2$ is opened again, and the voltage across the inductor changes polarity and the energy stored in the inductor $L_1$ is transferred to the capacitor $C_2$ through diode $D_1$. As the capacitor $C_2$ is charged, the gap voltage $V_G$ increases to its operating value. The energy transfer from the inductor $L_1$ to the capacitor $C_2$ takes only a fraction of a microsecond. Since the spark ignition delay is typically much longer, the capacitor $C_2$ is fully charged before the next spark occurs. After the spark ignition delay, a new spark is generated and the cycle is repeated, as illustrated in FIG. 3b.

Figure 4:
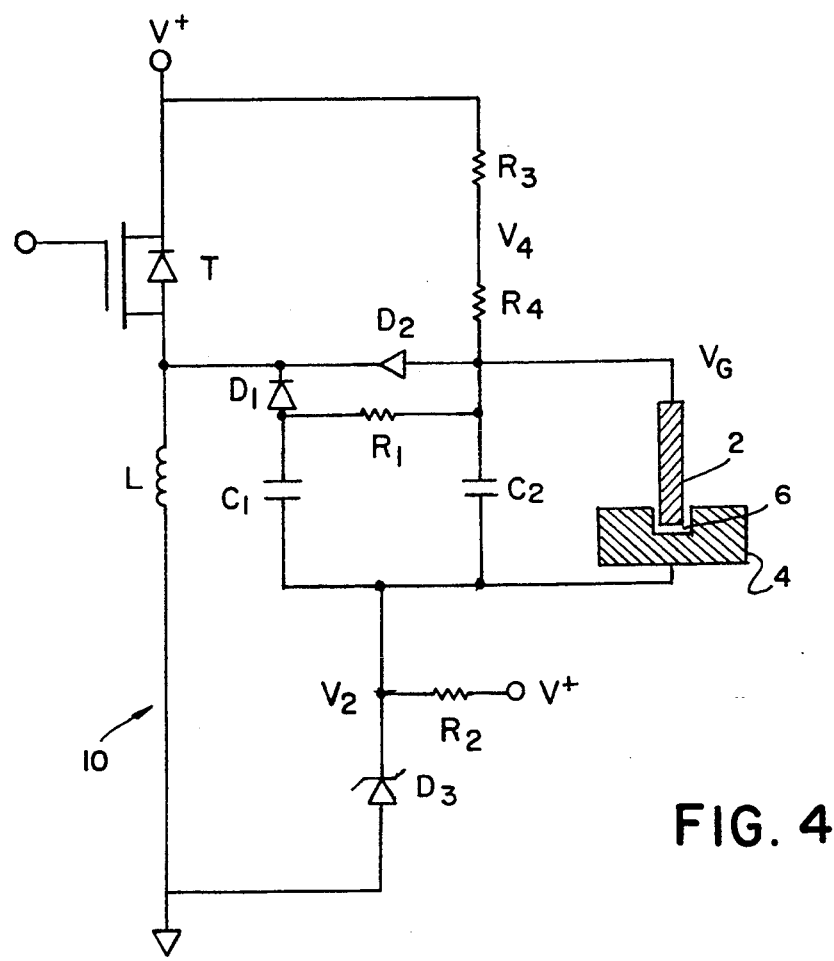
FIG. 4 schematically shows an implementation of the present invention, which provides control signals.

The actual implementation of the circuit requires a few additional components to provide control signals. One possible circuit 12 is shown in FIG. 4. Two control signals are provided in this circuit, $V_3$ and $V_4$. Control signal $V_4$ senses the gap voltage and control signal $V_3$ senses when there is a short across the gap 6 between the workpiece 4 and the electrode 2.

The gap voltage $V_G$ is sensed through the voltage divider formed by resistors $R_4$ and $R_5$ (voltage tap $V_4$). When the gap voltage decreases below an operator selected threshold value, a new charging cycle is triggered at transistor $T_2$. Following a spark, the spark capacitor $C_4$ is fully discharged and most of the inductor energy will be transferred to the spark capacitor $C_4$ through diode $D_3$. This is the normal mode of operation of the circuit.

Occasionally sparking may be momentarily interrupted (if the gap width increases as a result of vibration of the electrode, for example), and then both capacitors $C_3$ and $C_4$ gradually discharge through resistors $R_3$, $R_4$ and $R_5$, lowering the gap voltage. When the gap voltage decreases below its threshold value, a charging cycle is triggered by transistor $T_2$. This time the voltages across $C_3$ and $C_4$ are similar, and the inductor energy is shared between $C_3$ and $C_4$. To reduce the ripple in the gap voltage, the value of $C_3$ is chosen to be a factor of ten or more greater than the value of the spark capacitor $C_4$. The value of $R_3$ is sufficiently large (typically 100 kΩ or higher) to allow quenching of the spark following the discharge of capacitor $C_4$. When capacitor $C_4$ is discharged, the current through $R_3$ is less than 2 mA and, hence, it does not contribute significantly to the recharging of capacitor $C_4$. Capacitor $C_4$ is recharged primarily by the inductor energy transferred through diode $D_3$.

It is also necessary to interrupt the power to the electrode in the case of a short in the gap. The diode $D_4$ and the resistors $R_6$ and $R_7$ are used to detect this condition. In the absence of a short, the voltage $V_3$ is negative by a few volts. When a short develops, $R_6$ is connected to ground through diode $D_4$, and there is a rise in voltage $V_3$.

Figure 5:
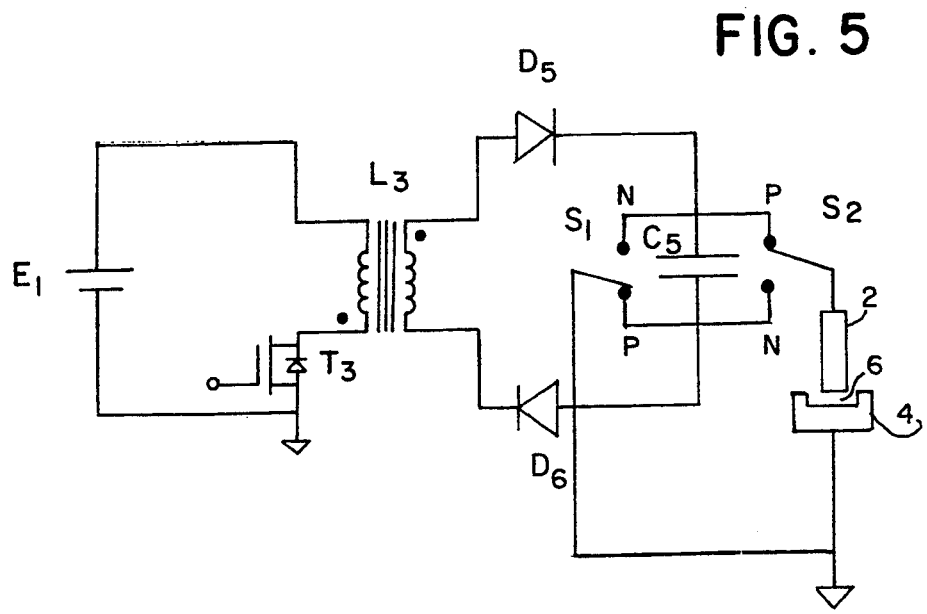
FIG. 5 schematically illustrates a transformer/inductor-charged EDM power supply of the present invention.

The use of a combined inductor/transformer to charge the EDM spark capacitor is illustrated in FIG. 5. The inductor $L_3$ has primary and secondary windings which are isolated electrically, but closely coupled magnetically. Following a spark, the transistor switch $T_3$ is closed and current flows into the primary windings building up the magnetic field in the inductor. During the inductor charge period, the diodes in the secondary circuit are reversed biased and no current flows in the secondary. When the transistor switch $T_3$ is opened, the polarity in both primary and secondary windings is reversed and the energy stored in the magnetic field of the inductor is rapidly transferred to the capacitor $C_5$. The capacitor voltage remains high until a new spark is triggered between the tool 2 and workpiece 4, and the cycle is repeated.

Using the transformer/inductor $L_3$ has the advantage of providing electrical isolation between the source $E_1$ and the spark gap 6. Electrical isolation, in turn, greatly simplifies the reversal of the spark gap polarity, by changing switches $S_1$ and $S_2$, for electrode dressing operations.

While the invention has been described with reference to specific embodiments, modifications and variations of the invention may be constructed without departing from the scope of the invention, which is defined in the following claims.

I claim:

1. An inductor-charged electric discharge machine apparatus, comprising an energy source, a switch connected to the energy source for selectively completing an interrupting circuit from the energy source, an inductor connected to the switch for receiving energy from the source through the switch, a diode connected to the inductor and a capacitor connected to the diode for flowing energy from the inductor through the diode to the capacitor when the switch disconnects a circuit from the energy source, an electrode tool connected to the capacitor and a workpiece connected to an opposite side of the capacitor, the tool spaced from the workpiece for forming a spark gap, whereby energy is transferred from the source to the inductor when the switch completes the circuit and is transferred from the inductor through the diode to the capacitor when the switch interrupts the circuit, and is transferred from the capacitor through the tool and workpiece across the spark gap for providing a machining discharge for physically effecting the workpiece, the inductor comprising a transformer having electrically isolated but magnetically closely coupled primary and secondary windings, and wherein the energy source and a switch are connected to the primary winding, and wherein two diodes and the spark capacitor are connected to the secondary side in such a manner that when the transistor switch is closed, the diodes are reversed biased and when the transistor switch is opened, the energy in the magnetic field of the inductor flows through the secondary winding and the forward biased diodes into the capacitor, for isolating the spark gap voltage from the energy source.

2. The apparatus of claim 1, further comprising two capacitor switches for selectively connecting the tool and the workpiece to the positive or the negative terminal of the capacitor, thereby interchanging the polarity of the tool and workpiece.

3. The apparatus of claim 1, wherein the energy is transferred from the source to the inductor in microseconds and from the inductor to the capacitor in tenths of a microsecond, and the sparking rate approaches a physical upper bound set by the spark ignition delay.

4. The apparatus of claim 1, wherein energy is transferred from the source to the inductor, and from the inductor to the capacitor without intervening resistors.

5. The electric discharge machining method, comprising energizing an inductor with energy from an energy source, discontinuing the energizing of an inductor and quickly transferring energy from the inductor to a capacitor, discharging the capacitor through a spark gap between a tool and a workpiece and repeating the charging cycle, wherein the inductor is a transformer, wherein the energizing of the inductor comprises storing energy in the magnetic field of a transformer by supplying energy to the primary winding of the transformer, and wherein the transferring of energy from the inductor to the capacitor comprises transferring energy from the secondary winding of the transformer through two diodes to the capacitor.

6. The electric discharge machining method, comprising energizing an inductor with energy from an energy source, discontinuing the energizing of an inductor and quickly transferring energy from the inductor to a capacitor, discharging the capacitor through a spark gap between a tool and a workpiece and repeating the charging cycle, wherein the energizing of the inductor and charging of the capacitor occur without interposing resistances, further comprising sensing shorts between the tool and the workpiece at a sensing point connected to the tool through a diode and energized by two resistors forming a voltage divider between ground and a second energy source of polarity opposite that of the inductor energy source.

7. The method of claim 6, further comprising charging the inductor in from about one to about ten microseconds, transferring the charge to the capacitor in less than one microsecond, and transferring high power to the gap with low spark energies.

8. The method of claim 6, further comprising sensing the gap voltage at a point between two resistances connected between the spark capacitor and the inductor energy source, and controlling the supplying of energy through the energizing of the inductor when the sensed voltage falls below a predetermined value.

* * * * *